Nov. 12, 1968 J. G. DROP 3,410,401

SUBSTRATE REWORK CONTROL CIRCUIT FOR A CHIP POSITIONING MACHINE

Filed May 27, 1965 10 Sheets-Sheet 1

INVENTOR
JOSEPH G. DROP

Nov. 12, 1968

J. G. DROP 3,410,401

SUBSTRATE REWORK CONTROL CIRCUIT FOR A CHIP POSITIONING MACHINE

Filed May 27, 1965

Nov. 12, 1968 J. G. DROP 3,410,401

SUBSTRATE REWORK CONTROL CIRCUIT FOR A CHIP POSITIONING MACHINE

Filed May 27, 1965

Nov. 12, 1968 J. G. DROP 3,410,401

SUBSTRATE REWORK CONTROL CIRCUIT FOR A CHIP POSITIONING MACHINE

Filed May 27, 1965 10 Sheets-Sheet 9

United States Patent Office 3,410,401

Patented Nov. 12, 1968

3,410,401

SUBSTRATE REWORK CONTROL CIRCUIT FOR A CHIP POSITIONING MACHINE

Joseph G. Drop, Poughkeepsie, N.Y., assignor to International Business Machines Corporation, New York, N.Y., a corporation of New York Filed May 27, 1965, Ser. No. 459,382
12 Claims. (Cl. 209—72)

This invention relates to a chip positioning machine for automatically assembling semiconductor chips onto printed-circuit substrates.

With the advent of hybrid transistor circuit technology, there arose more stringent requirements of precision, speed and uniformity than had theretofore been achieved in the art of automated circuit manufacture. This hybrid technique involves first the screen printing of the resistors and conductive lands on an alumina substrate. The transistors or diodes in the form of semiconductor chips are then positioned onto the conductive lands. Because the chips are almost microscopic in size, each measuring 0.028 inch square, and are joined to the lands by contact elements in the form of copper balls which are only 0.005 inch in diameter, they cannot be handled by conventional automated assembly techniques. The problem is further complicated by the need for extreme accuracy and precision in positioning the chips on the relatively small and closely-spaced conductive lands which are only 0.005 to 0.015 inch wide and 0.005 inch apart, as well as by the extreme delicacy of the structure involved.

Furthermore, the vast number of circuit substrates required in the manufacture of each digital computer, which is at present the primary use for this hybrid circuit technology, demands that the chip positioning operation be performed at relatively high speeds and with a high yield in order to maintain the high volume required in production. The large number of circuit substrates utilized in a single computer also demands uniformity in manufacture in order to increase the reliability of the final assembled apparatus.

In copending application Ser. No. 459,179 filed May 27, 1965, concurrently herewith and entitled, "Chip Positioning Machine," there is disclosed a novel machine for automatically positioning transistor and diode chips onto the conductive lands of printed-circuit substrates with precision, uniformity, at a high production rate, and without damage to the structure of either the chips or the substrates.

To accomplish this object, the substrates with the resistors and conductive lands already screen printed thereon are first automatically loaded onto a metal endless conveyor tape which carries the substrates sequentially through a number of chip positioning stations at each of which the semiconductor chips are picked up on the end of a vacuum needle and rotated through the angular displacement necessary for proper orientation to coincide with that of the substrate land pattern. The vacuum needle is then lowered to position the chip at a precise location on the pattern. The substrate is then carried by the conveyor tape to the succeeding chip positioning stations in sequence where additional chips are positioned onto various other respective portions of the substrate conductive land pattern.

After the last chip positioning station the substrate passes to a chip presence sensing device which detects whether all chips are properly positioned on the substrate. Any substrates which do not pass this test are then automatically removed from the conveyor tape by a rework head so that only good substrates arrive at the discharge end of the latter.

The present invention relates to an electrical circuit for controlling the operations of programming the pattern of locations on the substrate which are required to have chips thereon, sensing the pattern of those chips actually present on each substrate comparing the actual pattern of chips with the required pattern and actuating the rework head to remove from the conveyor tape all substrates having missing chips. The unacceptable removed substrates may then be reworked by placing chips thereon manually under a microscope, at the locations where chips are missing.

Although for purposes of illustration the semiconductor chips are disclosed as being of the type wherein each chip constitutes a single diode or transistor, it will be understood that the subject invention may also be utilized to position chips of the type wherein each constitutes a monolithic integrated circuit comprising a plurality of diodes and/or transistors as well as other circuit components together with conductive lands interconnecting same. Furthermore, the subject invention may find utility in other assembly operations where it is desired to position one or more smaller workpieces at precise locations upon a larger workpiece.

The foregoing and other objects, features and advantages of the invention will be more apparent from the following more particular description of a preferred embodiment of the invention, as illustrated in the accompanying drawings where:

Figure 17:
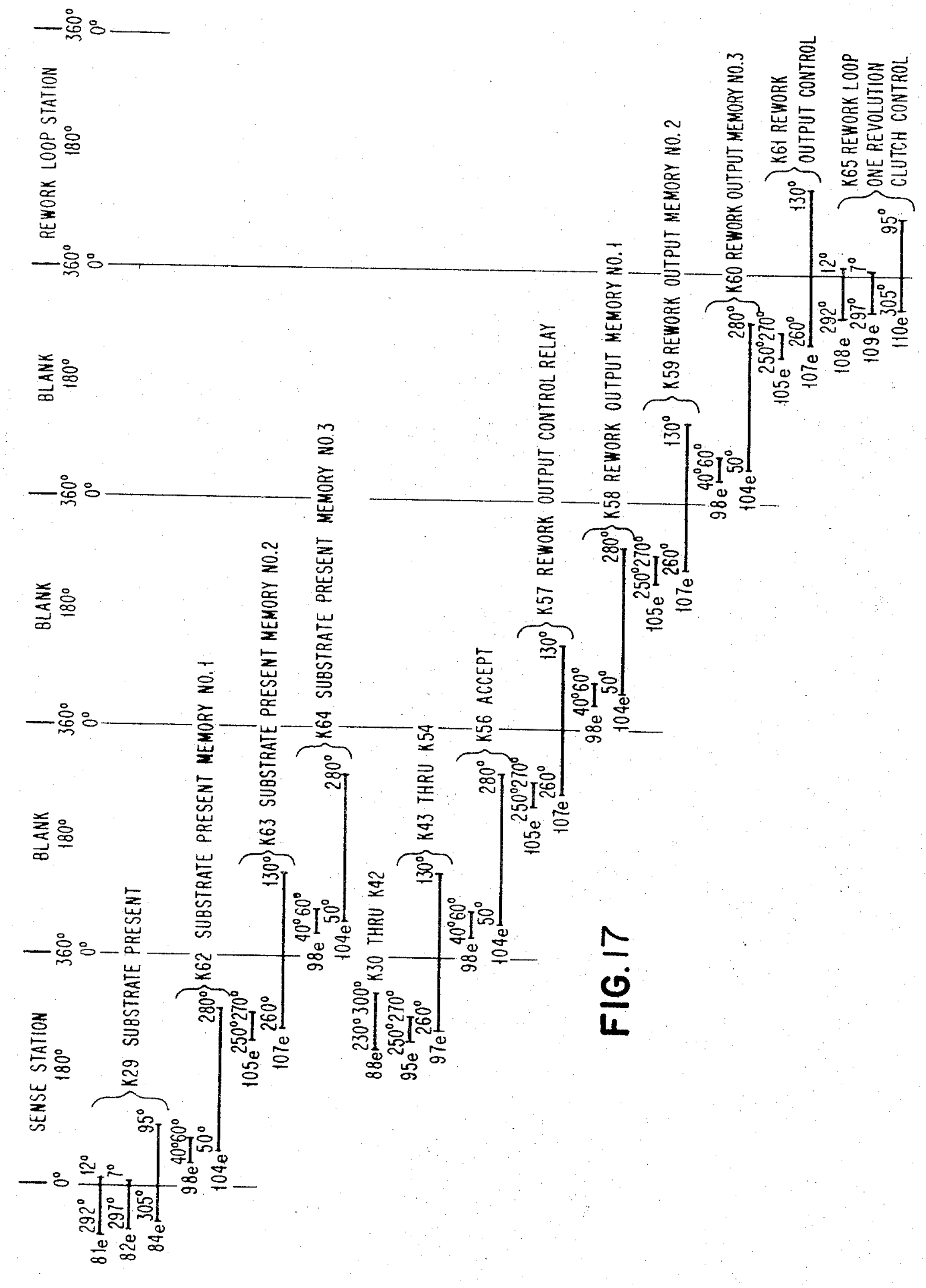

FIGS. 13 to 16 inclusive are electrical circuit diagrams showing the electrical control system for the subject machine; and FIG. 17 is a timing diagram showing the sequence of operations of several of the relays involved in the memory portion of the rework head control circuitry.

*Chip presence sensor*

Figures 1, 2:
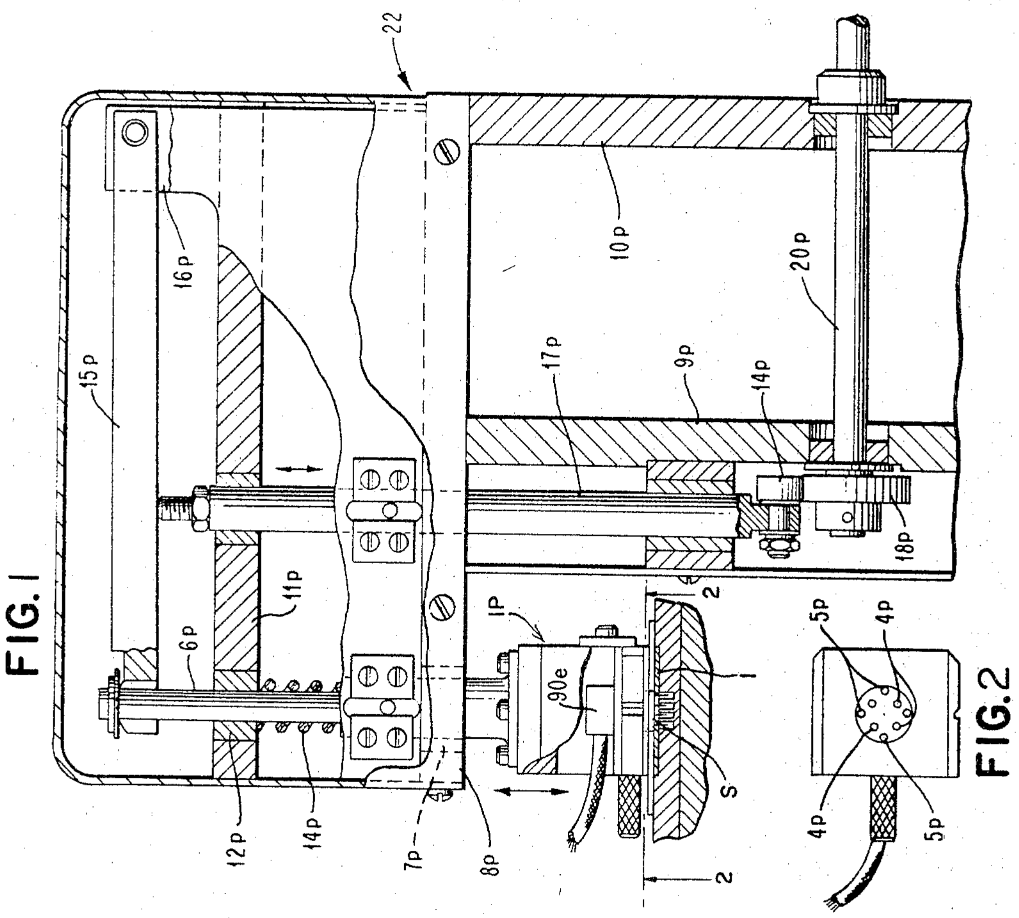
FIG. 1 is a side elevational view in broken section of a preferred specific embodiment of the chip presence sensor of the invention.
FIG. 2 is a fragmentary sectional view taken along line 2—2 of FIG. 1.
Figure 3:
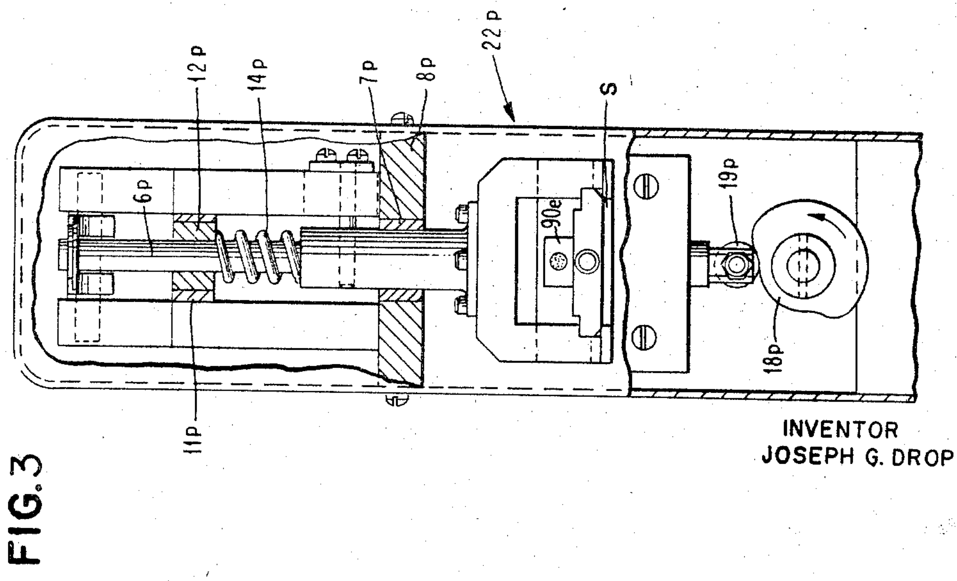
FIG. 3 is a fragmentary front elevational view, in partially in section, of the chip presence sensor shown in FIG. 1.

After the semiconductor chips C have all been positioned on the substrate at the respective chip positioning stations, the substrate is moved by a tape conveyor 1 to the chip presence sensor station. The preferred structure for the chip presence sensor 22 is illustrated in FIGS. 1, 2 and 3 of the drawings. A vertically movable sensing head **1*p* is mounted above the conveyor directly over the indexed position of the substrate S, as clearly shown in FIG. 1. The sensing head 1*p* has a plurality of slideably mounted protruding pins 4*p***, shown most clearly in FIG. 2, which are arranged in the same relative locations as the chips on the substrate. Obviously, the pins 4p can be repositioned to accommodate substrates of different design. When the sensing head is lowered, the pins are depressed into the head by the respective semiconductor chips on the substrate. If a chip is missing, the pin intended to sense its presence will not be depressed thereby providing a signal to indicate that the substrate is defective. Within head 1p are provided electrical switches which are actuated by the aforementioned pins. Appropriate electrical circuitry is provided to detect, via the electrical switches associated with the pins, whether or not all the chips are present. When a missing chip is detected a signal is sent to the subsequent station, which will be described hereinafter, to remove the substrate from the conveyor. In practice, each of the switches associated with the pins remains open when the pins are extended. When the pins are retracted by contact with a semiconductor chip properly positioned, the switches are closed, thus providing a signal that the substrate is complete as to chips. The circuitry is such that a single open switch will signal the subsequent rework head station to remove the substrate. Also provided on the bottom of head 1p is a plurality of protruding elements 5p which extend slightly beyond the chip sensing pins 4p when they are in extended position. Elements 5p provide a reference guide for pins 4p relative to the top surface of the module, and also prevent the ends of pins 4p from contacting any flux on the top of the module in the event that the thickness of the substrate varies. Flux, if allowed to come into contact with pins 4p, would likely cause sticking etc. resulting in erratic and undependable performance.

The head 1p is mounted for vertical reciprocation relative to conveyor 1. Head 1p is mounted on the lower end of reciprocating shaft 6p which is slidably mounted in bearings 7p and 12p, in turn mounted in horizontal frame elements 8p and 11p, respectively. Frame element 8p is rigidly mounted relative to the tape conveyor 1 by upright frame elements 9p and 10p. A compression spring 14p is provided to bias the head 1p and shaft 6p downwardly. An arm 15p is pivotally connected at one end to a lug 16p, and articulatively connected at the other end to the upper end of shaft 6p. Longitudinal reciprocating movement of rod 17p caused by cam 18p and cam follower 19p causes reciprocating movement of head 1p. Torque is transmitted from shaft 20p, whereupon the rotational movement is converted to reciprocating movement by cam 18p and cam follower 19p. The up and down movement of shaft 17p is in turn transmitted to shaft 6p and head 1p through arm 15p, in abutting engagement with the upper end of shaft 17p. As can be seen, the head 1p is in effect lowered over the module, with the force exerted downwardly being the additive effect of the weight of the head and associated elements, and the biasing force exerted by spring 14p. It can be seen that the head is not mechanically forced downwardly. With the arrangement described, damage or breakage of the elements of the apparatus is not likely in the event that a substrate extends upwardly beyond the anticipated vertical distance, as for example, a module not seated properly in the tape conveyor belt.

*Rework head*

Figures 4, 5, 6:
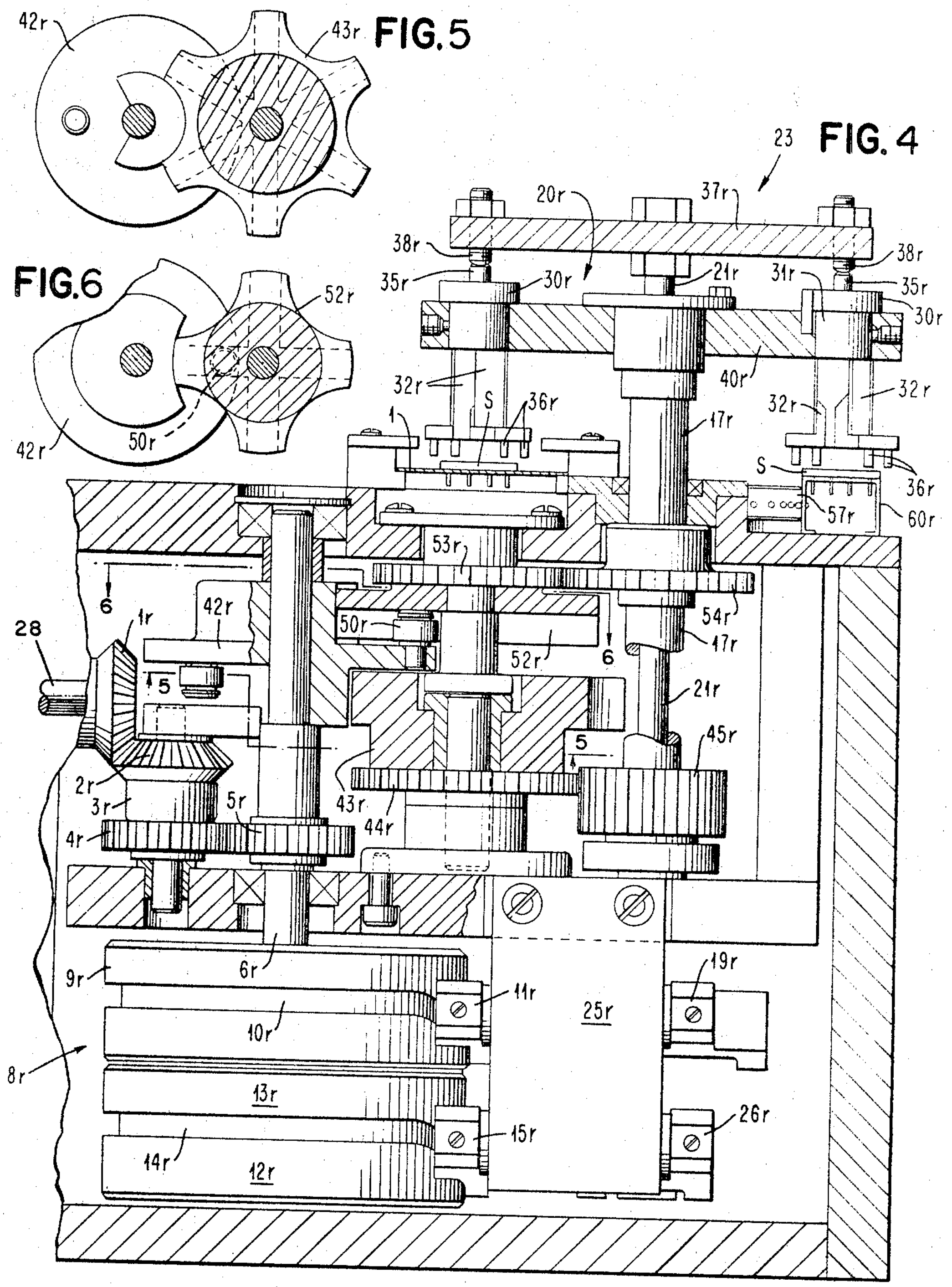
FIG. 4 is a fragmentary side elevational view in cross-section of a preferred specific embodiment of the rework head.
FIG. 5 is a detailed view of a Geneva drive of the turret indexing mechanism taken on line 5—5 of FIG. 4.
FIG. 6 is a detailed view illustrating the Geneva drive of the tray indexing mechanism taken on line 6—6 of FIG. 4.

After the substrate has been moved through the chip presence sensor 22, where each substrate is characterized as either an "accept" or a "reject," they are moved to the rework head 23, (see FIG. 4). This final station can be selectively programmed to remove from the tape conveyor 1 either all of the accepted substrates or all of the rejected substrates, or remove the rejected substrates and replace them with acceptable substrates. The rework head selects the substrates for removal in response to an electrical signal originating in the chip presence sensor 22. In other words, the chip presence sensor 22 detects whether or not all of the semiconductor chips are present in position on the substrate and then sends a signal to the rework head through an appropriate electrical circuit which causes the head to operate in the manner desired when the substrate is subsequently indexed to the rework head 23 from the chip presence sensor 22.

A preferred specific embodiment of a rework head 23 for use in the chip positioning machine is illustrated in FIGS. 4–10 of the drawings. In FIG. 4, there is shown a preferred specific embodiment of the driving mechanism of the rework head 23.

In the proper timing, a sequence shaft 28 is caused to rotate by the driving mechanism of the chip positioning machine (not shown). The shaft 28 is keyed to a bevel gear 1r, which in turn engages a bevel gear 2r on a jack shaft 3r. On the lower end of jack shaft 3r is provided a spur gear 4r which meshes with another spur gear 5r, which is rigidly keyed or otherwise secured to a cam driving shaft 6r. It can be seen that rotation of drive shaft 28 causes a corresponding rotation of the cam driving shaft 6r. Rigidly secured to the lower end of cam driving shaft 6r are turret or barrel cams 8r, and a clamp release cam 12r, whose function will become more apparent in the discussion that follows. The turret cam 8r consists of a cam actuator 9r provided with a camming groove 10r which slidably receives cam follower 11r. The turret cam 8r performs the function of moving a rework head indexing turret 20r in an up and down direction in order to pick up and deposit substrates S held in a clamp 30r. In general, in operation, the turret of 20r moves downwardly over a substrate positioned on tape conveyor belt 1, the clamp 30r is opened to grip the substrate, the clamp closed, and the turret moved upwardly in order to clear the pins of the substrate S from the conveyor belt 1. Cam 12r, comprising a cam actuator 13r having a camming groove 14r which slidably receives a cam actuator 15r, performs the function of opening jaws 32r of clamp 30r when it is desired to release the substrate S. The specific structure of the turret cam 8r and the clamp release cam 12r is shown more clearly in FIG. 8 of the drawing. As shown, cam follower 11r is connected to pins 16r disposed between the radial flanges 18r affixed to the lower end of turret shaft 17r. The pins 16r are supported on a U-shaped support arm or yoke 19r pivotally connected to an element 25r. The pins 16r are secured to the ends of the U-shaped support and extend inwardly. The cam follower 11r is generally in alignment with pins 16r and extend outwardly from one of the legs of the support 19r.

As is believed apparent, rotation of cam 8r will cause a longitudinal reciprocation of turret shaft 17r, which is free to rotate independently of the follower cam 11r. Cam follower 15r is stabilized by a pivotable U-shaped support 26r which is pivotally mounted at the base to element 25r. As is most apparent in FIG. 8, U-shaped support 26r is provided with a longitudinally extending slot 27r in each leg which receives cam follower 15r and allows it to slide longitudinally free of binding etc. Cam actuator 15r is pinned to clamp actuator rod 21r. Clamp actuator rod 21r does not rotate, but assumes the same angular position during reciprocation by the clamp release cam 12r.

Figures 7, 8, 9, 10:
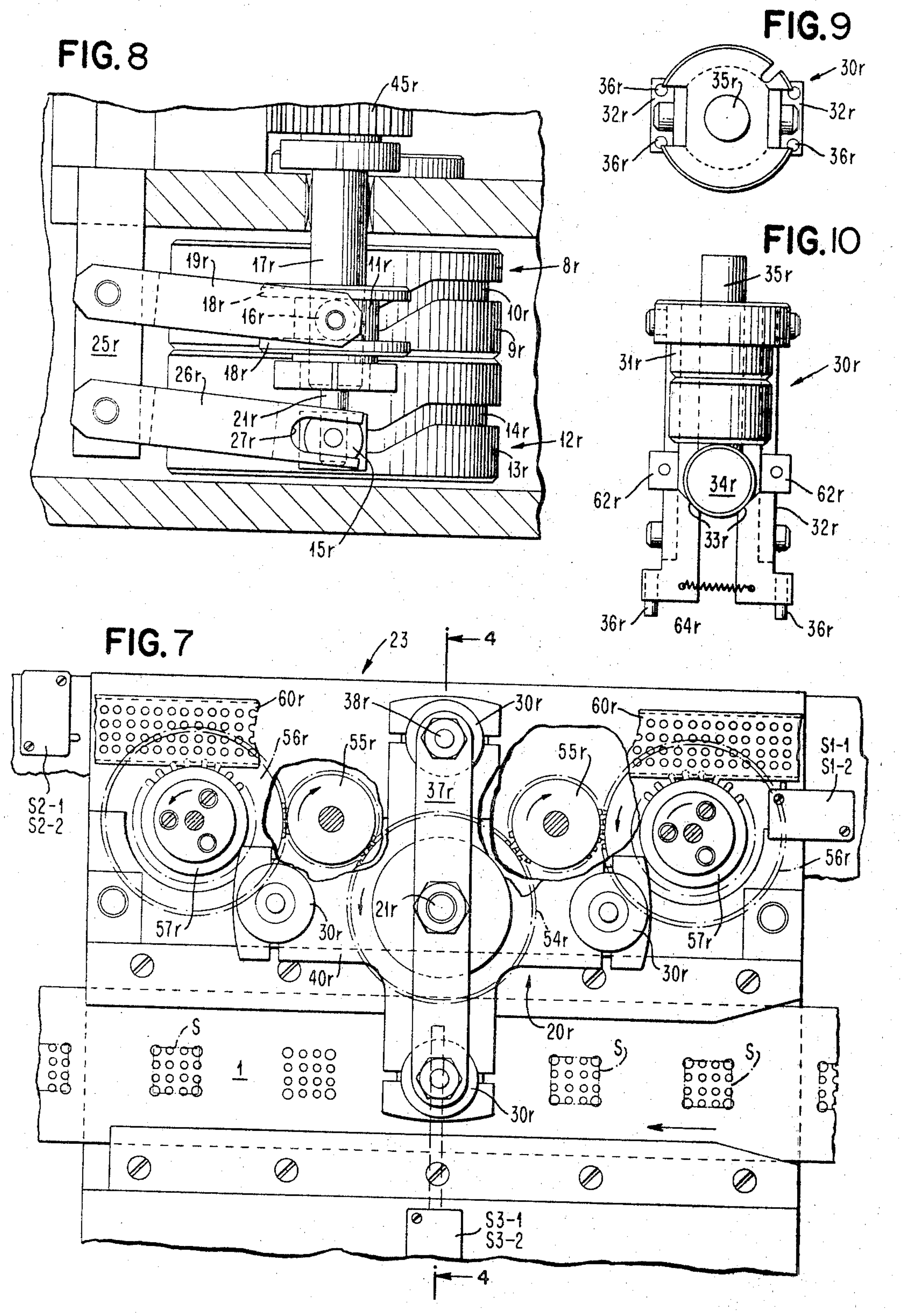
FIG. 7 is a top plan view of a preferred specific embodiment of the rework head illustrating its position relative to the tape conveyor belt.
FIG. 8 is a detailed view showing the front elevation of the camming mechanisms for actuating the turret head and the clamp release mechanism.
FIG. 9 is an enlarged plan view of the substrate clamp.
FIG. 10 is a side elevation view of the clamp shown in FIG. 9.

As most clearly shown in FIG. 10 of the drawings, the substrate clamp 30r has a head 31r on which are mounted articulated jaws 32r. Hinges 62r allow the lower portions of the jaws to open. The jaws 32r are each provided with an inclined camming surface 33r on the inside facing surfaces thereof. A cylindrically shaped clamp actuator 34r, mounted on the lower end of clamp release rod 35r, provides the mechanism to open the jaws 32r of clamp 30r. Downward movement of clamp release rod 35r forces the cylindrically shaped clamp camming actuator 34r into enagement with the camming surfaces 33r which forces the jaws outwardly. A spring 64r biases the jaws into a closed position. On the lower end of the jaws 32r are pegs 36r which frictionally grip the substrates S when in engagement therewith. A clamp release bar 37r, mounted on the top of clamp actuator rod 21r, has adjustable abutment screws 38r which are positioned to actuate the clamp release rods 35r of clamps 30r when the turret 20r positions the clamp in receiving and discharging positions (see FIGS. 4 and 7). From the foregoing description, the clamp release bar 37r, mounted on the top of clamp actuator rod 21r, maintains the same angular position relative to the chip positioning apparatus and tape conveyor 1, being positioned generally with one end over the conveyor and the other end over the loading or unloading station.

As can be seen in FIG. 4 of the drawings, the heads 31r of clamp 30r are rigidly mounted in the turret head 40r of turret 20r. As can be seen in FIG. 7, the turret head 40r is provided with four radially extending arms on each of which there is mounted a substrate clamp 30r. The turret head 40r is rotatably mounted on shaft 17r which can be longitudinally reciprocated as explained previously. The turret head cam 8r provides the means for longitudinally reciprocating turret shaft 17r, and the clamp release cam 12r provides the means to reciprocate clamp actuator rod 21r, which in turn opens the clamp jaws 32r of clamps 30r.

As illustrated in FIG. 72, a Geneva drive mechanism having a Geneva driver 42r rigidly mounted on shaft 6r is operatively engaged with Geneva wheel 43r. A spur gear 44r is rigidly mounted on the lower end of wheel 43r. Spur gear 44r is operatively engaged with a relatively wide spur gear 45r rigidly secured to turret shaft 17r. It can be seen that an angular driving engagement will be maintained between spur gears 44r and 45r during reciprocation of shaft 17r due to the width or thickness of spur gear 45r. As indicated in FIG. 4, rotation of shaft 6r will cause an intermittent angular rotation of the turret 20r which is characteristic of the Geneva drive mechanism. In FIG. 5 is shown the specific arrangement and construction of the Geneva driver 42r and Geneva wheel 43r.

On the upper side of Geneva driver 42r is provided a second Geneva driver 50r which is operatively engaged in Geneva wheel 52r. Rigidly mounted on the top of Geneva wheel 52r is a spur gear 53r operatively engaged with spur gear 54r. Gear 54r is rotatably disposed on shaft 17r and is therefore not in driving engagement therewith. As illustrated in FIG. 7 of the drawings, gear 54r is in meshing driving engagement with idler gears 55r, which in turn are in meshing engagement with gears 56r. Integral with gears 56r are two tray engaging sprockets 57r which are provided with teeth that engage a gear rack in the side of a tray 60r. It can therefore be appreciated that rotation of shaft 6r by gear 1r causes rotation of the Geneva driver 50r, in turn driving Geneva wheel 52r, in turn driving the tray indexing sprocket 57r. The rotation of gear 1r will produce a generally intermittent rotation of sprocket 57r, characteristic of a Geneva drive, which indexes or moves the trays 60r to the next position making available either a new substrate and/or a position to place a substrate, depending on the operation being programmed. The specific construction of the Geneva drive consisting of Geneva driver 50r and Geneva wheel 52r used to move the substrate tray 60r is shown in detail in FIG. 6 of the drawings.

The various gear ratios, the angular settings of the various gears, the Geneva drive dimension, and the camming arrangements necessarily in the aforedescribed apparatus to provide the proper sequence of steps and mode of operation is believed to be an exercise of mechanical skill and will therefore not be described in detail.

As mentioned previously, the rework head of the chip positioning machine can be used in any suitable manner. It can be programmed to remove either all of the acceptable substrates from the tape conveyor belt 1 and place same in trays, or on another conveyor line. It can also be used to remove only the rejected substrates and load same onto another conveyor line or tray, or it can be used to remove rejected substrates from the tape conveyor 1 and replace them with acceptable substrates taken from a tray or other type of storage handling device.

The preferred mode of operation of the rework head 23 is is remove rejected substrates in response to a signal from the chip presence sensor, and replace the defective substrate with an acceptable one taken from a tray. At the sam time, the defective substrate is placed in the tray in which the acceptable one was removed. In this mode of operation a number of trays of acceptable substrates are placed in operative position on the rework head which over a period of time removes the acceptable substrates, places same in the conveyor belt to substitute for defective substrates and also places the defective substrates in the tray. Thus, at the end of a period of time there is an exchange of good for defective substrates, which defective substrates can then be manually repaired or discarded.

A more specific mode of operation of the rework head 23 can be described as follows. Assume that a substrate S with one or more semiconductor chips missing is moved through the chip presence sensor 22 in which the missing chip or chips is detected. In response to the absence of a chip, a signal is produced which is programmed to the rework head 23. The substrate S upon arriving at the rework head station must be removed and a good substrate substituted therefor. The turret 20r is advanced 90 degrees with one of the clamps 30r in position over the substrate S.

The rework turret head 20r is indexed to a position over the substrate S by the driving engagement of the Geneva drives 42r and 43r, in turn in driving engagement with spur gears 44r and 45r. When the clamp is in position over the substrate, the entire turret head 20r is lowered into position with the turret cam 8r, which longitudinally reciprocates the turret shaft 17r. Before the clamps 30r are over the substrate they are opened by the action of the clamp actuator rod, in turn operatively driven by the clamp release cam 12r. The camming grooves 10r and 14r are formed to make possible the correct timing, that is the opening of the clamps 30r prior to their arrival at the pickup station. At the same time that one of the clamps 30r is moved downwardly over the tape conveyor belt 1, the opposite clamp on the turret 20r is also lowered over a tray 60r containing a number of good substrates. The clamps are subsequently closed over both the good and the defective substrates, the turret head 40r moved upwardly and indexed 90 degrees. This places the remaining intermediate opposite turret arms over the conveyor and the tray 60r respectively. During the previous cycle in which there was detected by the chip presence sensor a defective substrate, the arm of the turret 40r approaching the tape belt 1 had picked up a good substrate from the tray 60r. The opposite clamp approaching the tray had previously picked up a defective substrate from the belt in the previous cycle. The opposite arms and turret 40r are then lowered over the tape conveyor belt 1 and the tray 60r, the clamps 30r released, and the substrates placed in the respective positions.

It is understood that various modifications and changes can be made to the rework head 23r without departing from the spirit of the invention.

Figures 11, 11A:
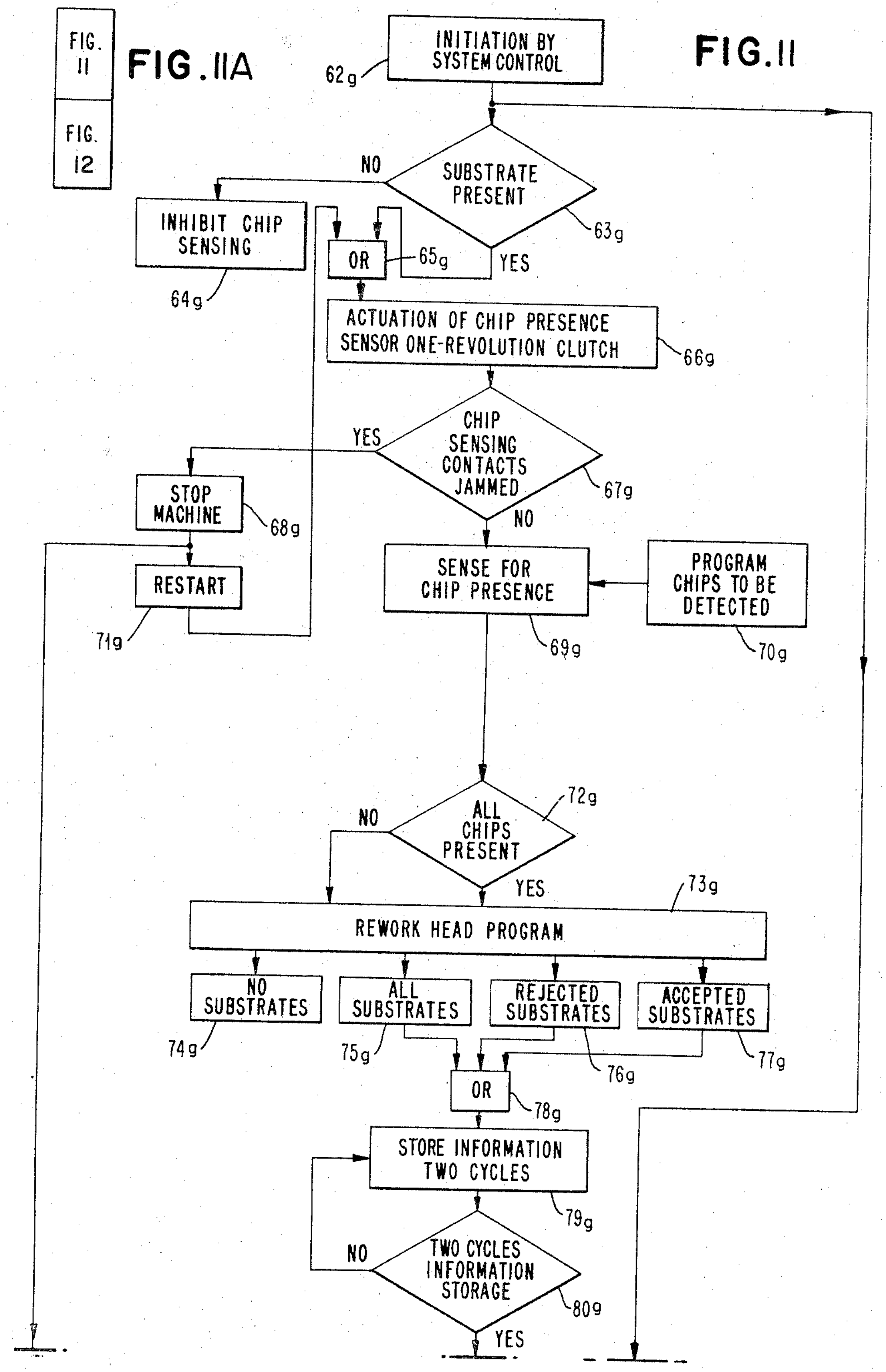
FIGS. 11, 11A and 12 are logic flow diagrams showing the sequence of operations and logical functions performed by the electrical control system.

Referring now to FIG. 11, there is shown the initial portion of the logic flow diagram relating to the electrical circuitry for controlling the chip presence sensor 22 and rework head 23. The logic operations are initiated at 62g (81e) by a signal from system control. The overall system control is described and shown in the commonly assigned, copending patent application Serial No. 459,179. The decision as to the detection of a substrate is indicated at 63g (83e, K29, 82e). A negative determination transmits a signal through the line marked "NO" so as to inhibit the chip sensing operation at 64g. An affirmative determination at 63g is transmitted through the line marked "YES" and "OR" function 65g so as to actuate the one-revolution clutch 669 operatively connected to the shaft 20P of the chip presence sensor 22, 96e (K55, K30–1 to K30–12, K31–1 to K42–1).

The first decision by the sensor 22 is to determine whether its own sensing contacts are jammed as at 67g. An affirmative determination is transmitted through the line marked "YES" so as to stop the machine at 68g. A negative determination indicating that none of the sensing contacts is jammed is transmitted through the line marked "NO" so that the sensor 22 may perform its main function of sensing for the presence of chips on the substrate as indicated at 69g (88e, 89e, 90e, K31 to K42). This operation is controlled by a manually selectable program at 70g (99e, 99e–1 to 99e–12) which indicates those chip positions on the substrate which are to be sensed for the presence of chips thereon. In the event that the machine is stopped at 68g, it may be manually restarted as indicated at 71g thereby transmitting a signal to the "OR" operation at 65g (85e, K29–2, 86e).

The sensing operation at 72g results in a decision as to whether all the chips C are present on the substrate S in those chip locations selected by the program at 70g. The substrate S is thereby characterized as either an "ACCEPTED" substrate or a "REJECTED" one. The rework head may be programmed at 73g (98e, K43–2 to K54–2, K56) so as to pick up either no substrates as at 74g (85e, K29–2, 86e), or all substrates as at 75g (106e–4), or "rejected" substrates as at 76g (105e, 106e–3, K64–2), or "accepted" substrates as at 77g (105e, 106e–2, K56–2). No information is transmitted from the "no substrates" condition 74g so that, in the event of the selection of this program, the rework head 23 remains inoperative.

The information as to whether all the chips are present at the programmed locations on the substrate, combined with the rework head programmed information at 75g, 76g, 77g is transmitted to the "OR" operation at 78g (105e, 106e–2, K56–2, K64–2) and this information is then stored for the time required for the sensed substrate to travel from the chip presence sensor 22 to the rework head 23 where the information is finally utilized by the latter. This information storage operation is indicated at 79g, and at 80g (K57 to K61) there is indicated a decision as to whether information was stored for the required in the illustrated instance two cycles.

Figure 12:
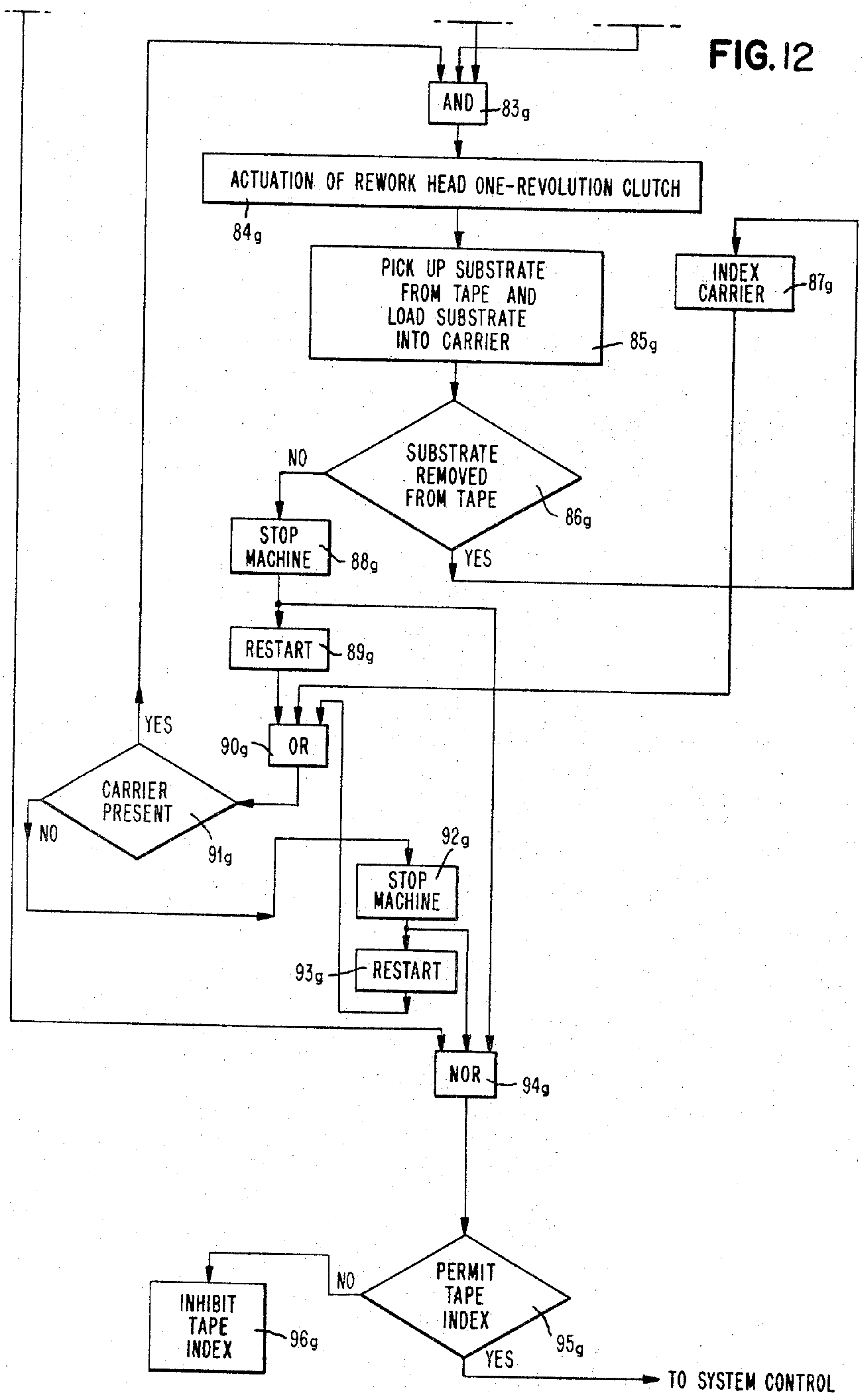
Figures 13A, 14:
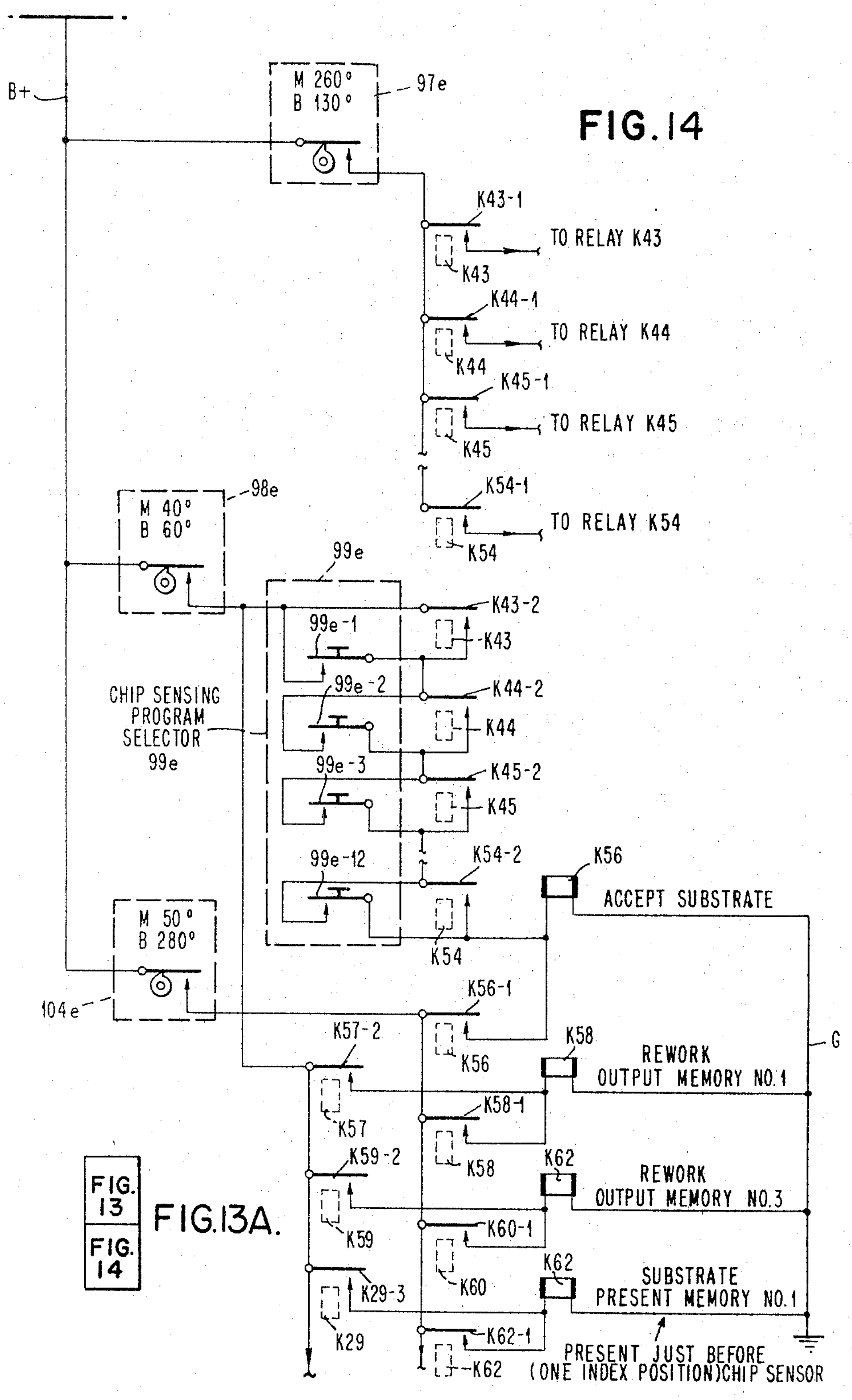
Figure 13:
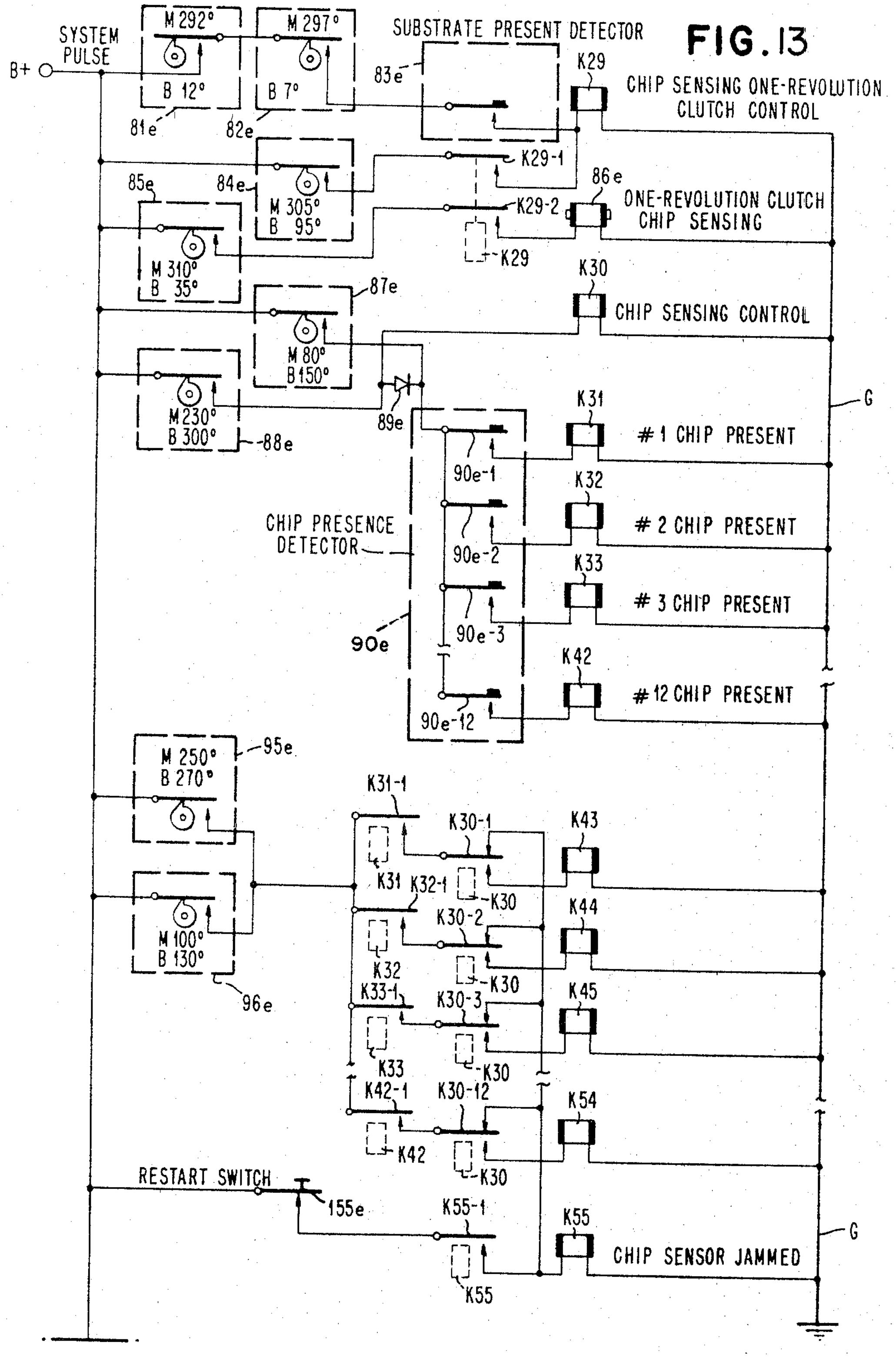
Figure 15:
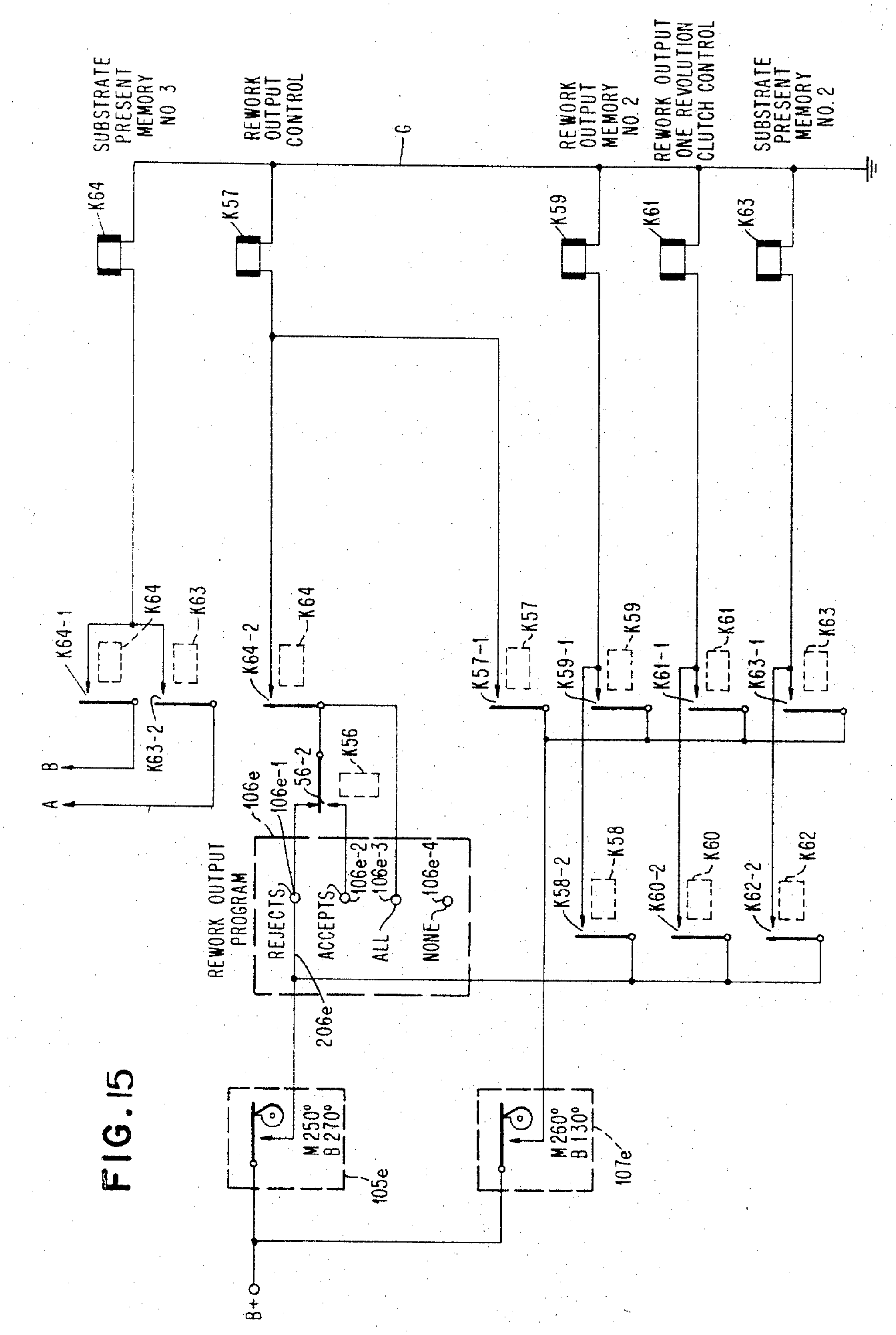
Figure 16:
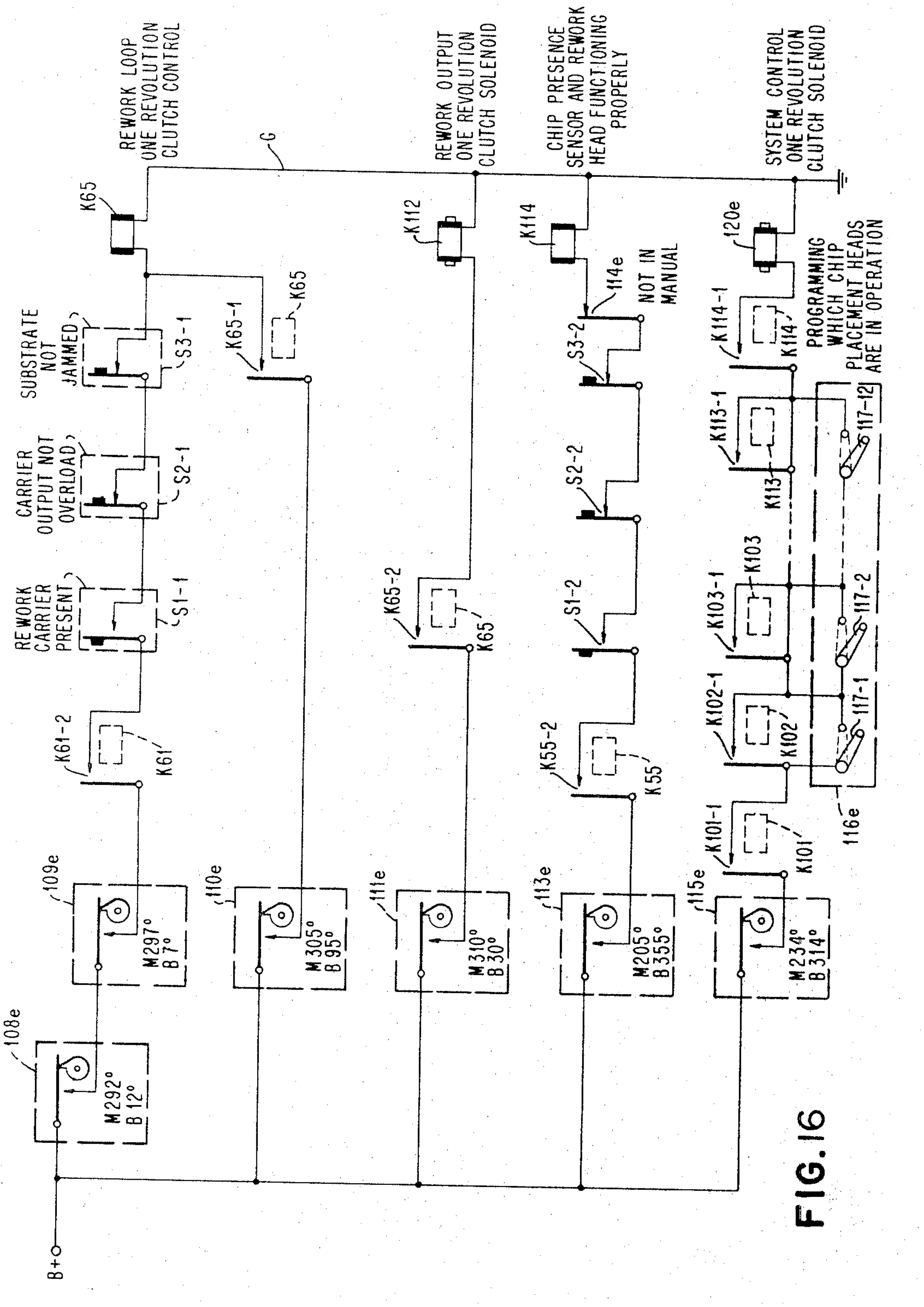

If the determination at 80g (K57, K58, K59, K69, K61) is negative then the "store information" operation at 80g is repeated until the required two cycles is obtained. The affirmative determination that the information was stored for two cycles at 80g is transmitted through the line marked "YES" to the input of the "AND" operation at 83g in FIG. 12. Said "AND" operation 83g has a second input connected to the affirmative determination output marked "YES" of the "CARRIER PRESENT" decision at 91g (S1–1). If both decisions at 81g, 91g are affirmative the one-revolution clutch 33 of the rework head is actuated at 84g (108e, 109e, K61–2, K65) causing the rework head 23 to remove a substrate S from the conveyor tape 1 and to load the substrate into a carrier as symbolized at 85g.

At 86g (53–1) a decision is made as to whether the rework head 23 succeeded in its task of picking up the substrate S and removing it from the conveyor tape 1. A negative determination is transmitted through the line marked "NO" to stop the machine at 88g. An affirmative determination is transmitted through the line marked "YES" to the "INDEX CARRIER" operation at 87g (S2–1).

This operation transmits a signal to the "OR" function at 90g which also has inputs from "RESTART" operations at 89g and 93g. Transmission of a signal through any of these inputs is transmitted through "OR" function 90g to initiate a logic decision at 91g as to whether a carrier is present to receive the substrate S removed from conveyor tape 1 by rework head 23.

If this determination is affirmative a signal is transmitted through the line marked "YES" to the "AND" operation 83g so that the rework head one-revolution clutch 33 will not be actuated at 84g unless a carrier is present to receive the removed substrate S.

If no carrier is present the decision at 91g is negative to transmit a pulse through the line marked "NO" so as to stop the machine at 92g and thereby transmit a signal to the "NOR" function at 94g. The latter also receives a signal in response to the machine stopping operation at 88g and also the machine stopping operation shown in FIG. 11 at 68g. If none of these inputs to the "NOR" function at 94g is energized, the PERMIT TAPE INDEX decision at 95g (113e, K55–2, S1–2, S2–2, S3–2, 114e) is affirmative to transmit a signal on the line marked "YES" to the system control. However, if any of the inputs to the "NOR" function 94g is energized, the decision at 95g is negative so as to inhibit the indexing of the conveyor tape at 96g.

Referring now to FIG. 102, pulse timing switches 81e and 82e are connected in series with a substrate presence sensor switch 83e located one tape index position before chip presence sensing station 22. Sensor switch 83e is provided with a feeler arm which closes the switch in response to engagement with a substrate S present on conveyor tape 1 at that position. This permits pulse timing switches 81e and 82e to energize a chip sensing one-revolution clutch control relay K29 which is maintained closed through its own contacts K29–1 by pulse timing switch 84e. Relay contacts K29–2 are thereby closed to permit pulse timing switch 85e to energize chip sensing one-revolution clutch solenoid 86e thereby actuating one-revolution clutch 669 (FIG. 11) which in turn actuates chip sensing head 22.

The reference numeral 90e indicates generally a chip presence sensor comprising series of twelve switches 90e–1 to 90e–12 inclusive, each of which may correspond to a particular chip location of substrate S and which will be closed when its respective feeler arm contacts and senses the presence of a chip C at that location. The left-hand terminals of said switches 90e–1 to 90e–12 are joined and connected in series with pulse timing switch 87e and their right-hand terminals are connected to a respective one of the twelve chip present relays K31 to K42 inclusive.

Before the actual chip presence sensing operation, chip presence sensor 90e is first tested to determine if any of the twelve switches 90e–1 to 90e–12 is accidentally jammed in a closed position. For example, suppose that switch 90e–2 is improperly closed before the chip presence sensing operation. In this event, relay K32 is energized to close contacts K32–1 thereby permitting pulse timing switch 96e to transmit a pulse to energize chip sensor jammed relay K55 held closed by its own contacts K55–1 through a normally-closed restart switch 155e. This will stop the machine in a manner to be described below.

Whether the circuitry is sensing for a jam in one of the switches 90e–1 to 90e–12 or for the presence of chips C on substrate S is determined by chip sensing control relay K30. When the latter is not energized, then the series of twelve double-throw relay contacts K30–1 to K30–12 inclusive will be in the condition shown in the drawing so that when one or more of the twelve normally-open relay contacts K31–1 to K42–1 inclusive is closed due to jamming of one of the switches, 90e–1 to 90e–12 only the chip sensor jammed relay K55 will be energized but none of the chip present relays K43 to K54 inclusive will be energized.

Relays K43 to K54 are energized only when chip presence sensor 90e senses that the corresponding chips C are present on substrate S. This occurs during the chip sensing operation determined by pulse timing switch 88e which energizes chip sensing control relay K30 to actuate all of the double-throw contacts K30–1 to K30–12 inclusive, thereby placing the twelve chip present relays K43 to K54 inclusive in series with the respective relay contacts K31–1 to K42–1 inclusive. The latter close in accordance with energization of the respective relays K31 to K42 inclusive by closure of the respective switches 90e–1 to 90e–12 in response to the presence of a chip at the respective location on substrate S.

Pulse timing switch 95e thereby transmits a pulse through the closed sets of contacts of the group K31–1 to K42–1 inclusive so as to energize those of the chip present relays K43 to K54 inclusive which correspond to locations on substrate S having chips C present thereon. Relays K43 to K54 inclusive are maintained energized for a longer period of time than the actual duration of the physical sensing operation through their own respective relay contacts K43–1 to K54–1 inclusive by pulse timing switch 97e.

Having sensed the pattern of chips C present on substrate S, it is then necessary to determine whether this pattern is an acceptable one; that is, whether the chips actually present constitute all those that are supposed to be present, or whether one or more chips are missing. For this purpose there is provided a chip sensing program selector shown in FIG. 103 and indicated generally by the reference numeral 99e. This selector comprises a series of twelve switches 99e–1 to 99e–12 inclusive, each adapted when closed to short-circuit a respective one of the twelve normally-open relay contacts K43–2 to K54–2 inclusive, arranged in series between pulse timing switch 98e and accept substrate relay K56. Energization of the latter indicates that the substrate S has thereon the required number of chips C at the sensed locations.

Since the printed-circuit pattern on a substrate S may be designed so as to have any number of transistor or diode chips up to a total of twelve in number, chip sensing program selector 99e is set by manually closing those of the twelve switches 99e–1 to 99e–12 which correspond to sensing locations where no chips are to be positioned for the particular printed-circuit pattern, whereas those switches corresponding to locations where chips are to be positioned are left in the open condition shown in the drawing. For example, assuming that it desired to sense only the presence of chips in the first two positions corresponding to the switches 90e–1 and 90e–2; that is, to determine the presence of chips designated "No. 1" and "No. 2," then program selector 99e is set by closing all of the ten switches 99e–3 to 99e–12 while switches 99e–1 and 99e–2 are left in the open condition. Therefore the presence of chip No. 1 and chip No. 2 results in the closure of switches 90e–1 and 90e–2 to energize relays K31 and K32 thereby closing relay contacts K31–1 and K32–1 to permit pulse timing switch 95e to energize relays K43 and K44 through the actuated double-throw relay contacts K30–1 and K30–2 respectively. This causes closure of relay contacts K43–2 and K44–2 in FIG. 103 thereby permitting a pulse from timing switch 98e to flow through these closed contacts and also through the ten closed switches 99e–3 to 99e–12 inclusive, thereby energizing accept substrate relay K56. If chip No. 1 and/or chip No. 2 is not present during the sensing operation, then switch 99e–1 and/or 99e–2 remains open so that relay K31 and/or K32 is not energized thereby preventing the energization of relay K43 and/or relay K44. This prevents the closure of contacts K43–2 and/or contacts K44–2 thereby opening the series path between pulse timing switch 98e and accept substrate relay K56. Therefore relay K56 is not energized in the event that one or both of the two sensed chips is missing.

Once it is determined that a particular substrate is accepted or rejected by energization or non-energization of accept substrate relay K56, the next consideration is whether rework output head 23 is programmed so as to pick up from the tape either all rejected substrates, or all accepted substrates, or all substrates, or no substrates. Those substrates picked up by rework head 23 are placed in tray carriers whereas those substrates not so picked up continue on conveyor tape 1 toward the discharge end of the latter. Generally, rework head 23 is programmed to remove all rejected substrates from tape 1 and to permit the accepted substrates to continue on tape 1 toward the next apparatus which is usually an oven (not shown) which permanently joins chip balls B to the substrate land pads P on which they have been placed by the subject chip positioning machine.

Referring now to FIG. 104 a rework output program selector is indicated generally by the reference numeral 106e and comprises a wiper arm 206e manually movable so as to contact either terminal 106e–1 to program rework output head 23 to remove rejected substrates S from the tape 1, or terminal 106e–2 to remove accepted substrates, or terminal 106e–3 to remove all substrates, or terminal 106e–4 to remove no substrates. Rework head 23 is generally utilized to remove the rejected substrates from conveyor tape 1 and therefore program selector 106e is shown in the drawings with the wiper arm 206e in contact with the "Rejects" terminal 106e–1.

If substrate S is accepted, accept substrate relay K56 will be energized and held by its own contacts K56–1 and pulse timing switch 104e to actuate relay contacts K56–2 thereby opening the circuit between terminal 106e–1 and rework output control relay K57 so that the latter will not be energized by pulse timing switch 105e. However, if substrate S is rejected, then relay K56 will not be energized so that relay contacts K56–2 remain in the condition shown in the drawing to complete a path from pulse timing switch 105e to rework output control K57, thereby energizing the latter.

Rework head 23 is to be actuated only when a substrate S is actually present on tape 1 at the rework station. As noted above, the presence of substrate S is detected by sensor switch 83e at a location one tape index position before chip presence sensing station 22. The information as to whether a substrate is present on tape 1 must therefore be retained in a memory for a duration of four index positions until the sensed substrate, or the portion of the tape where the substrate is missing, eventually reaches rework head 23. This memory function which retains the information as to the presence of a substrate is provided by the circuitry now to be described.

FIG. 106 shows the pulse timing sequence for the several relays constituting the substrate presence memory circuitry. The reference designation of each pulse timing switch (which transmits the pulse to energize each relay for the phase durations indicated by the respective horizontal lines) is placed to the left of each of these lines. Thus, for example, substrate present relay K29 is energized through pulse timing switch 82e from 297 degrees to 7 degrees and by pulse timing switch 84e from 305 degrees to 95 degrees, whereas substrate present memory relay K62 is energized through pulse timing switch 98e from 40 degrees to 60 degrees and through pulse timing switch 104e from 50 degrees to 280 degrees.

If a substrate S is present so as to close substrate presence sensor switch 83e, relay K29 is energized through system pulse timing switch 81e and pulse timing switch 82e from 290 degrees to 95 degrees as shown in FIG. 102 and also in FIG. 106. Referring now to FIG. 103 energization of relay K29 closes relay contacts K29–3 thereby permitting pulse timing switch 98e to energize a first substrate present memory relay K62 from 40 degrees to 60 degrees.

Referring back to FIG. 103 relay K62 is held energized through its own contacts K62–1 from 50 degrees to 280 degrees thereby closing its contacts K62–2 in FIG. 104 to energize a second substrate present memory relay K63 through pulse timing switch 105e from 250 degrees to 270 degrees. Relay K63 is held energized from 260 degrees to 130 degrees through its own contacts K63–1 and pulse timing switch 107*e*. This closes relay contact K63–2 to energize a third substrate present memory relay K64 from 40 degrees to 60 degrees through pulse timing switch 98*e*.

At the same time that relay K63 is being controlled by relay K62, relays K30 to K54 inclusive are being controlled by chip presence sensor 90e. Relays K43 to K54 inclusive are energized at 250 degrees to 270 degrees and are held through their own respective contacts K54–1 from 260 degrees to 130 degrees. Accept relay K56 is energized by pulse timing switch 98*e* from 40 degrees to 60 degrees and is held energized by its own contacts K56–1 and pulse timing switch 104*e* from 50 degrees to 280 degrees.

Assuming that rework output program selector 106*e* is set so that wiper arm 206*e* is in contact with "Rejects" terminal 106*e*–1 and that the particular substrate in question is a "reject" so that accept relay K56 is not energized and double-throw contacts K56–2 remain in the condition shown in the drawing, then rework output control relay K57 will be energized from 250 degrees to 270 degrees by pulse timing switch 105*e*. Relay K57 is held energized by its own contacts K57–1 from 260 degrees to 130 degrees through pulse timing switch 107*e*. Relay K57 when energized indicates that the particular substrate S that was sensed for the presence of chips thereon is to be removed by rework head 23 when the substrate arrives at rework station 23.

This information is transferred to a first rework output memory relay K58 which is energized from 40 degrees to 60 degrees through closed relay contacts K57–2 and pulse timing switch 98*e*. Relay K58 is held energized from 50 degrees to 280 degrees through its own relay contacts K58–1 and pulse timing switch 104*e*. This information is then transferred to a second rework output memory relay K59 which is energized from 250 degrees to 270 degrees through relay contacts K58–2 and pulse timing switch 105*e*. Relay K59 is held energized from 260 degrees to 130 degrees through its own contacts K59–1 and pulse timing switch 107*e*.

This information is then transferred to a third rework output memory relay K60 which is energized from 40 degrees to 60 degrees through relay contacts K59–2 and pulse timing switch 98*e* FIG. 103. Relay K60 is held energized through its own contacts K60–1 and pulse timing switch 104*e*. The information is then transferred to rework output control relay K61 which is energized from 250 degrees to 270 degrees through relay contacts K60–2 and pulse timing switch 105*e*. Relay K61 is held energized through its contacts K61–1 and relay 107*e* from 260 degrees to 130 degrees, thereby closing contacts K61–2 in FIG. 105.

The latter figure shows the circuit which controls the actuation of rework head 23. In series with pulse timing switches 108*e* and 109*e* are said contacts K61–2, a normally-open switch S1–1 which is closed in response to the presence of a rework carrier or container to receive the removed substrates, a normally-closed switch S2–1 which remains closed unless the carriers are entirely filled, a normally-closed switch S3–1 which remains closed unless a substrate becomes jammed, and a rework one-revolution clutch control relay K65.

It will thus be seen that if the conditions actuating switches S1–2, S2–1, and S3–1 are normal, and if relay K61 is energized to close contacts K61–2, then relay K65 will be energized and maintained closed through its own contacts K65–1 by pulse timing switch 110*e*. This closes normally-open relay contacts K65–2 to transmit a pulse from pulse timing switch 111*e* to rework output one-revolution clutch solenoid 112*e* thereby actuating one-revolution clutch 33 which in turn actuates rework head 23.

In series with pulse timing switch 113*e* and normally-closed relay contacts K55–2 are switches S1–2, S2–2 and S3–2 which are actuated in response to the same conditions as the respective switches S1–1, S2–1 and S3–1 described above. The reference numeral 114*e* indicates a normally-closed switch which remains closed unless the machine is set for manual operation. In series therewith is a relay K114 which when energized indicates that the chip presence sensor 22 and rework heads 23 are functioning properly.

The circuitry described above comprises the controls for the individual operating stations, and the overall system control will now be described. Referring to FIG. 105 a system pulse timing switch 115*e* is in series with the normally-open contacts K101–1 of relay K101, which when energized indicates that loader 5, dimpler 6 and fluxers 9, 15 are functioning properly. Connected thereto are the twelve normally-open relay contacts K102–1 to K113–1 inclusive of a chip head program selector indicated generally at 116*e*. Each of the latter relay contacts closes when its corresponding relay is energized to indicate that a respective one of the twelve chip placement heads 17 is functioning properly.

In parallel with each of these relay contacts K102–1 to K113–1 inclusive is a respective one of the series of twelve switches 117–1 to 117–12 inclusive which are left open when their respective chip placement heads 17 are in operation but which are manually closed when their respective heads 17 are to remain inoperative. In series with a program selector 116*e* are normally-open relay contacts K114–1 which close when relay K114 is energized to indicate that chip presence sensor 22 and rework head 23 are functioning properly.

Connected to K114–1 is a system control one-revolution clutch solenoid 120*e* which when energized causes the entire machine to proceed through the next cycle of operation. In view of the series connection of the several relay contacts between system pulse timing switch 115*e* and system control one-revolution clutch solenoid 120*e* the circuit performs a logical "AND" function in that solenoid 120*e* is not energized, and therefore the machine does not undergo the next cycle of operation, unless all of the relays K101 to K114 inclusive are either energized or shorted by switches 117–1 to 117–12 so as to indicate that loader 5, dimpler 6, flux dispenser 9 and flux flattener 15, those chip placement heads 17 that are programmed to be in operation, chip presence sensor 22 and rework head 23 have all functioned properly. In this event, solenoid 120*e* is energized to initiate the next cycle of operation of the machine. That is, one-revolution clutch 50 (FIG. 4) is actuated thereby to open all of the substrate clamps, index the conveyor tape to advance each substrate one index position, and close the clamps. Each operating station then performs its next cycle of operation.

What is claimed is:

1. In a machine for positioning semiconductor chips upon printed-circuit substrates carried on a conveyor to a sensor for detecting the pattern of the chips present on each substrate and then to a rework head actuable to remove a substrate from the conveyor, a rework control circuit comprising:

first program means for selectably varying the number and locations of chips constituting an acceptable chip pattern for each substrate, logic means responsive to said program means and said sensor to determine whether each substrate at the sensor has an acceptable chip pattern thereon, memory means to store said determination until said substrate reaches said rework head.

second program means for selecting whether the rework head is to remove substrates having either acceptable or unacceptable chip patterns thereon, and control means to actuate said rework head to remove the substrate from the conveyor if said determination coincides with the selection of said second program means.

2. In a machine for positioning semiconductor chips upon printed-circuit substrates and having a sensor for detecting the pattern of the chips present on each substrate and a rework head actuable to reject a substrate, a rework control circuit comprising:
first program means for selectably varying the number and locations of chips constituting an acceptable chip pattern for each substrate,
means responsive to said program means and said sensor to determine whether each substrate at the sensor has an acceptable chip pattern thereon,
means to convey said substrate from the sensor to said rework head,
memory means to store said determination until said substrate reaches said rework head,
second program means for selecting whether the rework head is to remove substrates having either acceptable or unacceptable chip patterns thereon, and
control means to actuate said rework head to reject the substrate if said determination coincides with the selection of said second program means.

3. In a machine for positioning semiconductor chips upon printed-circuit substrates carried on a conveyor to a sensor for detecting the pattern of the chips present on each substrate and then to a rework head actuable to remove a substrate from the conveyor, a rework control circuit comprising:
program means for selectably varying the number and locations of chips constituting an acceptable chip pattern for each substrate,
logic means responsive to said program means and said sensor to determine whether each substrate at the sensor has an acceptable chip pattern thereon,
memory means to store said determination until said substrate reaches said rework head, and
control means to actuate said rework head to remove the substrate from the conveyor if said logic means determined that the substrate does not have an acceptable chip pattern thereon.

4. In a machine for positioning semiconductor chips upon printed-circuit substrates carried on a conveyor to a sensor for detecting the pattern of the chips present on each substrate and then to a rework head actuable to remove a substrate from the conveyor, a rework control circuit comprising:
program means for selectably varying the number and locations of chips constituting an acceptable chip pattern for each substrate,
means responsive to said program means and said sensor to determine whether each substrate at the sensor has an acceptable chip pattern thereon, and
control means to actuate said rework head to remove the substrate from the conveyor if said substrate does not have an acceptable chip pattern thereon.

5. In a machine for positioning semiconductor chips upon printed-circuit substrates and having a sensor for detecting the pattern of the chips present on each substrate and a rework head actuable to reject a substrate, a rework control circuit comprising:
program means for selectably varying the number and locations of chips constituting an acceptable chip pattern for each substrate,
means responsive to said program means and said sensor to determine whether each substrate at the sensor has an acceptable chip pattern thereon, and
control means to actuate said rework head to reject the substrate if said substrate does not have an acceptable chip pattern thereon.

6. In a machine for positioning semiconductor chips upon printed-circuit substrates carried on a conveyor to a sensor for detecting the pattern of the chips present on each substrate and then to a rework head actuable to remove a substrate from the conveyor, a rework control circuit comprising:
logic means responsive to said sensor to determine whether each substrate at the sensor has an acceptable chip pattern thereon,
memory means to store said determination until said substrate reaches said rework head, and
control means to actuate said rework head to remove the substrate from the conveyor in response to a determination that said substrate does not have an acceptable chip pattern thereon.

7. Apparatus for determining semiconductor chip patterns on a printed-circuit substrate and displacing selected substrates in accordance with said determination, said apparatus comprising:
a sensor for detecting the physical pattern of the chips present on each substrate,
a rework head actuable to displace a substrate,
first program means for selectably varying the number and locations of chips constituting an acceptable chip pattern for each substrate,
logic means responsive to said program means and said sensor to determine whether each substrate at the sensor has an acceptable chip pattern thereon,
memory means to store said determination,
second program means for selecting whether the rework head is to displace substrates having either acceptable or unacceptable chip patterns thereon, and
control means to actuate said rework head to displace the substrate if said determination coincides with the selection of said second program means.

8. Apparatus for determining semiconductor chip patterns on a printed circuit substrate and displacing selected substrates in accordance with said determination, said apparatus comprising:
a sensor for detecting the physical pattern of the chips present on each substrate,
a rework head actuable to displace a substrate,
first program means for selectably varying the number and locations of chips constituting an acceptable chip pattern for each substrate,
means responsive to said program means and said sensor to determine whether each substrate at the sensor has an acceptable chip pattern thereon,
means to convey said substrate from the sensor to said rework head,
memory means to store said determination until said substrate reaches said rework head,
second program means for selecting whether the rework head is to displace substrates having either acceptable or unacceptable chip patterns thereon, and
control means to actuate said rework head to displace the substrate if said determination coincides with the selection of said second program means.

9. A machine for positioning semiconductor chips upon printed-circuit substrates and comprising:
a sensor for detecting the pattern of the chips present on each substrate,
a rework head actuable to displace a substrate,
program means for selectably varying the number and locations of chips constituting an acceptable chip pattern for each substrate,
logic means responsive to said program means and said sensor to determine whether each substrate at the sensor has an acceptable chip pattern thereon,
memory means to store said determination until said substrate reaches said rework head, and
control means to actuate said rework head to displace the substrate if said logic means determined that the substrate does not have an acceptable chip pattern thereon.

10. A machine for positioning semiconductor chips upon printed-circuit substrates and comprising:
- a sensor for detecting the pattern of the chips present on each substrate,
- a rework head actuable to displace a substrate,
- program means for selectably varying the number and locations of chips constituting an acceptable chip pattern for each substrate,
- means responsive to said program means and said sensor to determine whether each substrate at the sensor has an acceptable chip pattern thereon, and
- control means to actuate said rework head to displace the substrate if said substrate does not have an acceptable chip pattern thereon.

11. A machine comprising:
- a sensor for detecting the pattern of chips present on a substrate,
- a rework head actuable to reject a substrate,
- program means for selectably varying the number and locations of chips constituting an acceptable chip pattern for each substrate,
- means responsive to said program means and said sensor to determine whether each substrate at the sensor has an acceptable chip pattern thereon, and
- control means to actuate said rework head to reject the substrate if said substrate does not have an acceptable chip pattern thereon.

12. A machine comprising:
- a sensor for detecting the pattern of chips present on a substrate,
- a rework head actuable to displace a substrate,
- logic means responsive to said sensor to determine whether the substrate at the sensor has an acceptable chip pattern thereon,
- conveyor means to convey said substrate to said rework head,
- memory means to store said determination until said substrate reaches said rework head, and
- control means to actuate said rework head to displace the substrate in response to a determination that said substrate does not have an acceptable chip pattern thereon.

References Cited

UNITED STATES PATENTS

| | | | |
|---|---|---|---|
| 2,748,235 | 5/1956 | Wallace | 219—4 |
| 2,887,622 | 5/1959 | Rayburn | 209—81 X |
| 3,032,191 | 5/1962 | Clukey | 209—81 X |
| 3,039,604 | 6/1962 | Bickel | 209—81 X |
| 3,142,382 | 7/1964 | Knowles | 209—75 |
| 2,996,184 | 8/1961 | Barton | 209—72 |

M. HENSON WOOD, Jr., *Primary Examiner.*

R. A. SCHACHER, *Assistant Examiner.*

PO-1050
(5/69)

UNITED STATES PATENT OFFICE
CERTIFICATE OF CORRECTION

Patent No. 3,410,401 Dated November 12, 1968

Inventor(s) J. G. Drop

It is certified that error appears in the above-identified patent and that said Letters Patent are hereby corrected as shown below:

In the specification:

Column 5, line 24: Shown as "FIG. 72" should be -- FIG. 4 --

Column 6, line 5: Shown as "is is" should be -- is to --

Column 7, line 2: Shown as "669" should be -- 66g --

Column 9, line 26: Shown as "FIG. 103" should be -- FIG. 14 --

Column 10, line 12: Shown as "FIG. 104" should be -- FIG. 15 --

Column 10, line 48: Shown as "FIG. 106" should be -- FIG. 17 --

Column 10, line 71: Shown as "FIG. 103" should be -- FIG. 14 --

Column 10, line 73: Shown as "FIG. 104" should be -- FIG. 15 --

Column 11, line 46: Shown as "FIG. 103" should be -- FIG. 14 --

Column 12, line 14: Shown as "FIG. 105" should be -- FIG. 16 --

Signed and sealed this 15th day of February 1972.

(SEAL)
Attest:

EDWARD M.FLETCHER,JR.
Attesting Officer

ROBERT GOTTSCHALK
Commissioner of Patents